United States Patent [19]

Peterken

[11] Patent Number: 4,720,224
[45] Date of Patent: Jan. 19, 1988

[54] SLEEVE ANCHOR

[75] Inventor: William H. Peterken, Higganum, Conn.

[73] Assignee: United Industries Corporation, St. Louis, Mo.

[21] Appl. No.: 868,411

[22] Filed: May 29, 1986

[51] Int. Cl.$^4$ .............................................. F16B 13/06
[52] U.S. Cl. ....................................... 411/36; 411/37; 411/55; 411/57; 411/60
[58] Field of Search .................. 411/34, 35, 36, 37, 411/38, 55, 57, 60, 61, 71, 73, 74

[56] References Cited

U.S. PATENT DOCUMENTS

| | | | |
|---|---|---|---|
| 1,111,660 | 9/1914 | Malaby | 411/38 |
| 1,293,844 | 2/1919 | Malaby | 411/36 |
| 1,394,925 | 10/1921 | Marshall | 411/34 |
| 3,171,322 | 3/1965 | Kaplan | 411/57 |
| 3,667,341 | 6/1972 | Kaplan | 411/60 |
| 3,668,968 | 6/1972 | Modrey | 411/74 |
| 3,750,519 | 8/1973 | Lerich . | |
| 3,750,526 | 8/1973 | Lerich . | |
| 4,330,230 | 5/1982 | Giannuzzi | 411/55 |
| 4,334,813 | 5/1982 | Oettl . | |

FOREIGN PATENT DOCUMENTS

| | | | |
|---|---|---|---|
| 3023411 | 1/1982 | Fed. Rep. of Germany | 411/34 |
| 3225579 | 1/1984 | Fed. Rep. of Germany | 411/8 |
| 1525127 | 4/1968 | France | 411/36 |
| 338589 | 7/1959 | Switzerland | 411/55 |
| 591637 | 9/1977 | Switzerland | 411/61 |
| 1217850 | 1/1969 | United Kingdom | 411/55 |

*Primary Examiner*—Gary L. Smith
*Assistant Examiner*—Rodney M. Lindsey
*Attorney, Agent, or Firm*—Kalish & Gilster

[57] ABSTRACT

A sleeve anchor for use in a pre-drilled hole in concrete, masonry and the like includes a bolt with threaded outer end for receiving an internally threaded pressure member, e.g., a nut. The inner end defines a shank terminating in a head of diameter greater than the shank. The head has a tapered wedge-forming shoulder adjoining the shank. A sleeve is disposed concentrically upon the bolt and includes a collar extending along a threaded portion of the bolt at its upper outer end is disposed for receiving longitudinal pressure toward the inner end of the bolt generated by tightening of the nut. An inner portion of the collar is of petalform configuration, having three petals extending along the shank in closely-spaced side-by-side relationship. The petals are joined at proximal ends to the collar by respective pillars each of narrow arcuate extent, providing windows between the pillars of greater arcuate extent. The pillars have distal ends which contact and ride up the shoulder for radially outward expansion of the sleeve upon tightening of the pressure member. The distal ends of the petals each have a lobular prominence whereby together they form in section an enhanced hexagon or trilobular configuration. Further, each petal forms at its proximal end a singular ear along a leading side edge, formed by an outwardly extending corner portion, for providing gripping antirotational engagement of interior surfaces of the hole upon insertion of the anchor. The sleeve is formed of resilient, ultimately deformable metal to permit torsional distortion of the pillars upon tightening of the pressure member, causing foreshortening of the sleeve to provide pre-loading of the anchor within the hole.

5 Claims, 5 Drawing Figures

U.S. Patent  Jan. 19, 1988  4,720,224
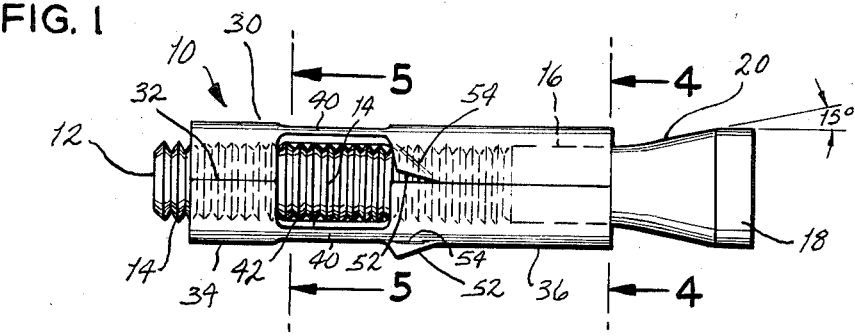
FIG. 1
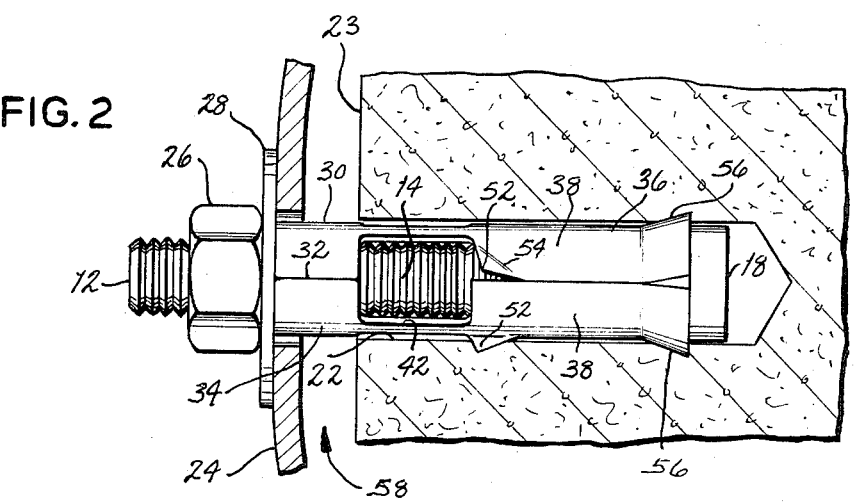
FIG. 2
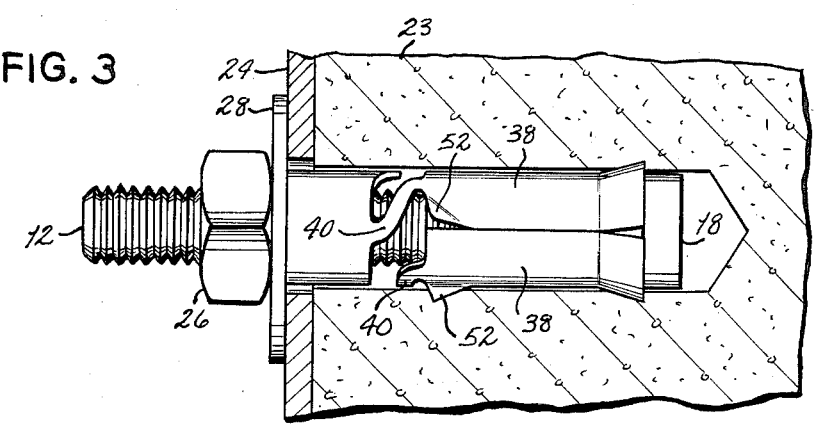
FIG. 3
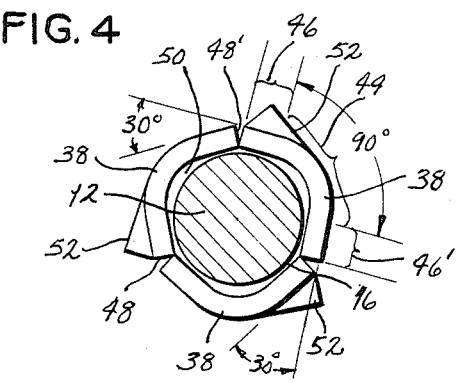
FIG. 4
FIG. 5

SLEEVE ANCHOR

BACKGROUND AND SUMMARY OF THE INVENTION

This invention relates generally to expansion-type bolts, and more particularly, to a sleeve anchor of the type having a bolt and an expansion sleeve longitudinally shiftable upon tightening of the bolt to wedge the sleeve anchor within a hole or recess in rock, concrete, solid concrete block, hollow concrete block, grout-filled hollow concrete block, mortar joints, brick, masonry or other like material.

A sleeve anchor is a species of anchor bolts, wherein a metal sleeve extending along a bolt is caused to shift upon tightening of the bolt for tightly expanding within a hole bored into concrete, concrete blocks, masonry and various materials of this character. The anchor is thus used for securement of extrinsic structures, such as building materials, shelving, structural members and so forth. Such devices are customarily employed in many fields, including construction as well as for the fastening of machinery and equipment to masonry or rock structures.

As conventionally configured, the bolt includes a wedge-defining portion which causes outward expansion of the sleeve upon tightening of the bolt. An example is disclosed in Lerich U.S. Pat. No. 3,750,526. Also representative of the prior art are Lerich U.S. Pat. No. 3,750,519 and Oettl U.S. Pat. No. 4,334,813.

The key element in a sleeve anchor is the expansion sleeve which compresses the concrete, or other hard material as the bolt or so called stud is partially withdrawn from the hole upon tightening of a nut, inasmuch as the expansion sleeve configuration is determinative of the performance character of the anchor in the areas of setting of the anchor within the hold, tensile performance (i.e., the anchoring capability or ultimate tensile strength when secured), and ultimate failure mode.

Heretofore, conventional sleeve anchors have exhibited difficulties in enabling the sleeve anchor to be installed and to be "set" in the hole. Conventionally, the sleeve provides a springy slip fit in a typical hole and such does not provide enough friction to prevent the sleeve from rotating within the hole upon tightening, as well as sometimes permitting the anchor to slide out of the hole. Further, in hollow concrete block installations, where little of the exposed surface material of the sleeve will bear against the internal surfaces of the hole, slippage is frequently encountered, resulting in substantial installation difficulties. Matters are rendered more difficult by the need to provide for both resistance to rotation as well as withdrawal for the anchor when originally inserted into the hold, prior to tightening.

A further requirement and desirability for structural anchors is the ability to pre-load; that is, to positively clamp a fixture to the substrate or base material in which the hole is provided. Without pre-loading with development of clamping force for so affixing the fixture to the substrate, any tensile load upon the structure will result in immediate fixture looseness and/or strain. When pre-loading is to be provided, the tensile force developed or exerted by the structure upon the anchor, as tightened, must exceed the pre-load in order for looseness and/or strain to occur. The ability to pre-load beyond the normal working load of a sleeve anchor ensures that it will provide proper structural performance. In other words, there should not result any looseness or strain at normal working loads.

Accordingly, among the several objects of the present invention may be noted the provision of an improved sleeve anchor; the provision of such an anchor which, when inserted in a hole in concrete, masonry or other building materials, will set reliably therein to prevent rotation or withdrawal until tightening of the anchor; the provision of such an anchor which provides pre-loading upon tightening to positively clamp a fixture to the substrate or base material, namely the concretee, masonry, or other building material receiving the anchor, and providing pre-loading beyond the normal working load of the sleeve anchor so that tensile forces must exceed the pre-load capability for looseness and/or strain to occur; the provision of such a sleeve anchor which provides pre-loading such as heretofore normally associated only with stud anchors; the provision of such a sleeve anchor having far greater pre-loading than heretofore possible; the provision of such a sleeve anchor which has a higher ultimate tensile strength than other sleeve anchors, and particularly through use of an expansion sleeve that develops the full strength of the substrate material, such as concrete, masonry and so forth, and the provision of such a sleeve anchor having a sleeve uniquely configured for development of maximum compressive forces for confirmation with the circumference of the stud thereof for reliable and secure maintenance within the substrate hole upon tightening; and the provision of such a sleeve anchor which is not prone to catastrophic anchor failure, reliably providing ultimate tensile value even under strain.

Briefly, a sleeve anchor in accordance with the invention for use in a pre-drilled hole in concrete, masonry and the like, comprises a bolt including a threaded outer end for receiving an internally threaded pressure member, such as a tightening nut, and an inner end defining a shank extending from the outer end and terminating in a head of greater diameter than the shank. The head has a tapered wedge-forming shoulder adjacent to the shank, the head constituting the leading edge of the anchor for being inserted in the hole with the threaded outer end extending from the hold for receiving the tightening nut for tightening by its rotation. A sleeve is disposed concentrically on the bolt. The sleeve is formed to include a collar positioned concentrically around the bolt and extending along a portion of its threaded portion at the upper end thereof. The collar is disposed for receiving longitudinal pressure toward the inner end of the bolt generated by tightening of the tightening screw. The collar includes an inner portion of petalform configuration comprising three petals extending along the shank and closely-spaced side-by-side but separate relationship to surround the shank. The petals are joined at proximal ends to the collar by respective pillars, each of narrow arcuate extent, to provide windows between the pillars. Such windows are of arcuate extent greater than each pillar. Distal end of the petals contact the end of the shoulder such that upon tightening of the pressure tightening screw, the petals are caused to ride up the shoulder for radially outward expansion of the sleeve within the hole. The distal ends of the petal each form in section a central arc and straight portions extending from opposite ends of the arc thereby to provide for each petal a vee-shaped lobal prominence of approximately 90° included angle, whereby the distal ends of the petals together form in section an enhanced hexagon of trilobular configuration. Each petal forms at its proximal end a single ear disposed along the leading side edge thereof, the ear being constituted by an outwardly extending corner portion of the respective petal. The ears provide gripping anti-rotational engagement of interior surfaces of the hole upon insertion of the anchor into the hole to prevent rotation of the sleeve therein upon rotation of the tightening screw. The sleeve is formed of resilient ultimately deformable metal to permit flexing of the ears and the distal ends of the petals to permit torsional distortion of the pillars upon continued tightening of the tightening screw caused by pressure between the opposite ends of the sleeve. Such causes pre-loading of the anchor within the hole.

Other features will be in part apparent and in part pointed out hereinbelow.

BRIEF DESCRIPTION OF THE DRAWINGS

FIG. 1 is a side elevation view of a sleeve anchor in accordance with and embodying the present invention;

FIG. 2 is a longitudinal cross-section through a substrate, i.e., material such as concrete in which there is a blind borehole, the new sleeve anchor being shown within such hole in a seated, tightened condition prior to pre-loading;

FIG. 3 is a view similar to FIG. 2 but depicting the sleeve anchor after pre-loading.

FIG. 4 is a transverse cross-section taken of the sleeve anchor as taken along line 4—4 of FIG. 1.

FIG. 5 is a transverse cross-section of the sleeve anchor as taken along line 5—5 of FIG. 1.

Corresponding reference directors indicate corresponding elements throughout the several views.

DESCRIPTION OF THE PREFERRED EMBODIMENT

Referring to the drawings, indicated generally at reference numeral 10, the new sleeve anchor comprises a bolt 12 including a threaded outer end 14 and an inner end 16 defining a shank extending from the outer end and terminating in a head 18 of diameter greater than shank 16, the head having a tapered wedge-forming shoulder 20 adjoining the shank. Head 18 constitutes the leading end of anchor 10 for being inserted into a hole.

Referring to FIG. 2, such a hole of a substrate material is designated at 22, being a bore, for example, as drilled into a concrete block, masonry, brick, or any of various hard substrate materials 23 in which sleeve anchors of the type with which the invention is concerned are utilized for the purpose of anchoring a structure, such as that designated at 24, to the substrate by tightening of a pressure member such as a nut 26 threaded upon the outer end 14 of bolt 12. For this purpose, threads are provided over a majority of the length of the bolt 12 to accommodate a relatively wide latitude for movement of bolt 26 upon tightening, and as conventional, a washer as at 28 may be used, as well as spacers (not shown) or the like for providing suitable accommodation between the bolt 26 or other pressure member, the structure 24 and the elements of the sleeve anchor.

Fitted upon the bolt 12 is a sleeve 30 which, as explained below, will be caused to shift longitudinally upon bolt 12 and to be expanded by movement upwardly onto shoulder 20 for pressure engagement of the interior surfaces of hole 22. Such engagement tightly locks the sleeve anchor 10 within the hole for permitting the development of high tensile forces upon the sleeve anchor and for tightly affixing the structure, as indicated at 24, to substrate material 23.

For this purpose, shoulder 20 is formed at an angle of preferably about 15° to the longitudinal axis of bolt 12. Sleeve 30 is disposed concentrically upon bolt 12, being formed from a single blank, as stamped from a sheet of strong, resilient, ultimately deformable material such as steel alloy and then rolled into a cylindrical configuration. Such results in a seam 32 between adjacent edges, and such seam does not require closure or other union of the opposing edges of the material. In any event, there is provided for the sleeve a collar 34 extending along a part of the bolt threaded portion 14 and disposed for receiving longitudinal pressure toward the inner end of bolt 12 upon tightening of nut 26. The sleeve is also provided with an upper portion 36. It is of petalform configuration, being comprises of three petals 38 which extend along shank 16 in closely-spaced side-by-side but separate relationship to thereby surround shank 16. Petals 38 are joined at proximal ends to collar 34 by respective pillars or stauchions 40 each of narrorw arcuate extent and rectangular section (FIG. 5). As viewed in FIG. 5, such pillars provide windows, as at 42. Such windows are of arcuate extent greater than each of the pillars. Distal ends of petals 38 contact the shoulder 20 when sleeve 30 is urged toward head 18 of the bolt, whereby upon tightening of nut 26 or other pressure member, petals 38 are caused to ride up on shoulder 20 for radially outward expansion of the sleeve within the hole 22.

The distal ends of the petals are uniquely configured. Referring to FIG. 4, the distal end of each such petal 38 forms in section a central arc 44 and straight portions 46, 46' extending from opposite ends of the arc portion thereby to provide for each petal 38 a vee-shaped lobal prominence of approximately 90° included angle. Further, an angle of 30° is formed between proximal, adjacent straight portions of the adjacent petals. Accordingly, as viewed in section in FIG. 4, the distal ends of the petals 38 together form in section an enhanced hexagon of trilobular configuration. This provides for each of petals 38 distal corners, as at 48, 48', serving to provide gripping antirotational engagement of surface of shoulder 20 to prevent rotation of bolt 12 upon tightening of nut 26. Further, there is provided between each central arc portion of the petal 38 and bolt 12 a slight spacing, as shown for example at 50, serving to create for each distal portion of the petals a lobular prominence of springy character for more tightly gripping of the interior surfaces of hole 22 upon insertion of the sleeve anchor.

Each petal 38 is provided with means for providing gripping antirotational engagement of interior surfaces of the hold upon insertion of the sleeve anchor therein. For this purpose, each petal 38 is provided with an ear in the form of an outwardly extending corner portion 52 on its leading edge, i.e., the edge of the petal in the direction of advancing rotation of nut 26 upon tightening, such as would tend inherently to urge rotation of sleeve 30 within the hole, and which rotation will be resisted by such ears 52 as the sleeve anchor is inserted in the hole such by tending to force each such ear 52 into the substrate material. Each ear 52 is created by an upsetting of the sleeve material upon a line of fold 54, which is skewed from the longitudinal axis of the sleeve anchor. Insertion of the bolt thus will intrinsically tend to force a slight resilient deflection, at least, of each such ear 52 upon its respective line of fold 54 as the anchor is inserted. In FIGS. 2 and 3, representative digging into the substrate material 23 is illustrated in at least slightly exaggerated fashion.

Similarly also, there is flexing of each petal 38 upon the narrow pillars 40 as tightening of nut 26 forces the distal ends of the petals up onto the surfaces of shoulder 20.

Accordingly, it is seen that, upon tightening of nut 26, the sleeve anchor may be caused to be affixed securely in the substrate hole 22 by rotation of nut 26 or other tightening member, and the wedging action of shoulder 20 causes the distal ends of sleeve 30 to be forced radially outwardly, as well as longitudinally toward head 18, until the distal ends of the petals, such as shown in FIG. 2 at 56, until wedged tightly against and/or into the substrate material as shown.

FIG. 2 illustrates that such tightening of the sleeve anchor may occur even though the structure 24 to be secured upon tightening of the sleeve anchor is not touching the substrate material. For purposes of illustration, therefore, there is shown at 58 a gap between structure 24 and substrate 23, such as would occur if structure 24 were loaded with weight, or were flexed outwardly from the substrate.

Upon tightening, the new sleeve anchor provides that is termed pre-loading for positively clamping the structure or other fixture 24 tightly to the substrate or base material 23. Flexion of petals 38 and wedging by shoulder 20 tightly compresses the distal portions of the petals for locking the anchor reliably in place within hole 22 to set the anchor. However, upon continued tightening of nut 26 or other tightening means, sleeve 30 is compressed by washer 28 (and spacers may be use if desired) for providing longitudinal pressure toward the inner end of the sleeve anchor. Such pressure beween the opposite ends of the sleeve, the inner end being tightly clamped within the bore as illustrated, and the other end being compressed by tightening of nut 26, causes selective torsional distortion of pillars 40 as shown in FIG. 3 and with resultant foreshortening of sleeve 30 to permit nut 26 to draw structure 24 tightly against substrate 23, as illustrated. In this regard, pillars 40 do not simply collapse, but rather are caused to twist or undergo torsional distortion into an S-shaped, serpentine form, as illustrated, as torque is applied through the washer 28 tending to cause rotation of collar 34. Such torisonal distortion is progressive.

The resultant pre-loading is such that any tensile force applied to the anchored sleeve anchor, as transferred through the load or structure 24, must exceed the pre-load force thus provided in order for looseness and/or strain to occur. The new sleeve anchor thereby assures the ability to pre-load beyond the normal working load of the fastened sleeve anchor to ensure proper structural performance and to preclude looseness or strain at normal working loads. The relatively narrow pillars 40, in relation to windows 42, gives assurance that such pre-loading is selective and controlled, so that it may occur in a progressive manner to accomodate a substantial variation in spacing between the load or structure 24 and substrate 23 as may be found in practice. In effect, a pre-loading distance is created which is equal to the height (transverse to the arcuate extent) of the window 42 adjacent to each pillar, less the width (arcuate extent) of the pillar. Such a pre-loading characteristic is thereby achieved for the first time in a sleeve anchor. Heretofore, it has been conventional to regard only stud anchors as capable of providing of pre-loading.

A further advantage is apparent from consideration of FIG. 4, wherein the enhanced lobular characteristic of each petal 38 is illustrated. The lobular prominences for each petal provide a unique cross-section in the area where the anchor sleeve must expand when tightened, and thereby in the area where compression will occur within the concrete or other substrate material 23. The lobal prominences, with their 90° included angle, are believed to require additional force when being forced into conformation with the circumference of shoulder 20 and head 18 upon tightening, thereby causing increased radial pressure and compression within the material, such as concrete, and so resulting in increased ultimate tensile strength. There is, accordingly, less tendency for the petals to "iron out" upon tightening, such as may occur with conventional anchors.

Upon insertion, the ears 52 of the sleeve also provide an additional advantage since they act, in effect, like barbs and flex and fold upon the lines of fold 54 so that they enter and travel into the hole easily as the sleeve anchor is inserted. When such ears bite into the material, they not only prevent rotation of the expansion sleeve about the longitudinal axis but also act to prevent withdrawal of the sleeve anchor from the hole. Such feature is especially important and advantageous when the new sleeve anchor is used for hollow masonry block applications where the rear side of the hole may tend to be blown out or enlarged by the impact of a hammer drill bit, providing a cone-shaped hole rather than the uniform bore illustrated in the drawings. In practice, it is sometimes found that the damage to such a hole in hollow masonry block installations is sufficient to leave only enough material to be engaged by ears 52 by which the new anchor is thereby held sufficiently affixed within the hole to permit subsequent tightening to occur.

In the failure mode, the new sleeve anchor provides higher ultimate tensile strength than conventional anchors. Such performance is verified by ASTM testing. The performance is due in larger part to the provision of expansion sleeve 30 which develops the full strength of the substrate material, such as concrete, and obviates pull-through failures. The ultimate failure mode provided for the new sleeve anchor is the most desirable, namely a spall cone failure, where concrete is the substrate material. This type of failure demonstrates the maximum holding power possible, namely the full strength of the substrate material. Heretofore, maximum holding power in this type of failure was associated only with stud type anchors. In general, the new sleeve anchor provides little slip, if any, prior to failure. Such no-slip performance permits the use of the new sleeve anchor as a structural anchor, whereas heretofore only stud type anchors characteristically have been used for structural anchoring.

In view of the foregoing, it will be seen that the several objectives of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed:

1. A sleeve anchor for use in a pre-drilled hole in concrete, brick, masonry and the like substrate materials, comprising a bolt threaded at one end for receiving a pressure member and including a shank providing at the other end a head of diameter greater than the shank, the head including a wedge-forming shoulder adjoining the shank, a sleeve disposed concentrically upon the bolt including an inner portion of petal-form configuration including three petals having distal ends presented for contacting the shoulder, the petals extending along the shank in closely-spaced side-by-side but separate relationship, the distal ends of the petals each defining in section a vee-shaped lobal prominence extending outwardly of the shank whereby the distal ends of the petals together form in section a figure of closed trilobular configuration, the sleeve being shiftable longitudinally upon the shank for setting in response to pressure upon the sleeve provided by the pressure member for causing the petal distal ends to ride up the shoulder for pressure engagement of substrate material interiorly of the hole for anchoring the sleeve anchor within the hole, the sleeve including pre-load structure for causing selective foreshortening of the sleeve to provide pre-loading of the sleeve anchor following setting in response to further pressure upon the sleeve provided by the pressure member, the pre-load structure comprising a collar of the sleeve disposed at its outer end and a plurality of rectilinear longitudinally extending pillars interconnecting the petals to the collar, the pillars being of narrow arcuate extent and between them windows of the sleeve of arcuate extent greater than the pillars, the collar including a collar-defining portion and each of the petals including a proximal end connected by a respective pillar to the collar-defining portion, each of the petals forming an ear disposed along a leading side edge of the petal for providing gripping antirotational engagement of interior surfaces of the hole, the pillars being torsionally deformed upon said further pressure for causing said foreshortening of the sleeve.

2. A sleeve anchor as set forth in claim 1 wherein each ear is constituted by an outwardly extending corner portion of the respective petal.

3. A sleeve anchor according to claim 1, wherein the arcuate extent of each of the pillars and windows is respectively substantially constant over a major portion of their respective longitudinal extents.

4. A sleeve anchor for use in a pre-drilled hole in concrete, brick, masonry and like substrate materials, comprising a bolt threaded at one end for receiving a pressure chamber and including a shank providing at the other end a head of diameter greater than the shank, the head including a wedge-forming shoulder adjoining the shank, a sleeve disposed concentrically upon the bolt including an inner portion of petalform configuration including petals having distal ends presented for contacting the shoulder, the sleeve being shiftable longitudinally upon the shank in response to pressure upon the sleeve provided by the pressure member for causing the petal distal ends to ride up the shoulder for pressure engagement of substrate material interiorly of the hole for anchoring the sleeve anchor within the hole, the sleeve including pre-load means for causing selective foreshortening of the sleeve in response to further pressure upon the sleeve provided by the pressure member, whereby to provide pre-loading of the sleeve anchor, the petals being three in number and extend along the shank in closely-spaced side-by-side but separate relationship to surround the shank, the distal ends of the petals each defining in section a vee-shaped lobal prominence extending outwardly of the shank whereby the distal ends of the petals togther form in section a closed figure of trilobular configuration the distal ends of the petals each forming in section a central arc and straight portions extending from opposite ends of the arc, the vee-shaped lobal prominence being of approximately 90° included angle whereby the petals together form in section an enhanced hexagon of trilobular configuration.

5. The sleeve anchor for use in a pre-drilled hole in concrete, masonry and the like, comprising:
   a bolt including a threaded outer end for receiving an internally threaded pressure member and an inner end defining a shank extending from the outer end and terminating in a head of diameter greater than the shank, the head having a tapered wedge-forming shoulder adjoining the shank, the head constituting the leading end of the anchor for being inserted into the hole with the threaded outer end extending from the hole for receiving the pressure member to provide tightening by rotation thereof; and
   a sleeve disposed concentrically upon the bolt, the sleeve including
   a collar positioned concentrically around the bolt and extending along part of the bolt threaded portion at the upper end thereof, the collar being disposed for receiving longitudinal pressure toward the inner end of the bolt generated by tightening of the pressure member, and an inner portion of petalform configuration comprising three petals extending along the shank in closely-shaped side-by-side but separate relationship to surround the shank, the petals being jointed at proximal ends to the collar by respective pillars each of narrow arcuate extent to provide windows between the pillrs of arcuate extent greater than that of each pillar, the petals having distal ends contacting the shoulder whereby upon tightening of the pressure member the petals are caused to ride up the shoulder for radially outward expansion of the sleeve, the distal ends of the petals each forming in section a central arc and straight portions extending from opposite ends of the arc thereby to provide for each petal a vee-shaped lobal prominence of approximately 90° included angle, and whereby the distal ends of the petals together form in section an enhanced hexagon of trilobular configuration,
   each petal forming at its proximal end a single ear disposed along a leading side edge thereof, each ear being constituted by an outwardly extending corner portion of the respective petal, the ears providing gripping antirotational engagement of interior surfaces of the hole upon insertion of the anchor into the hole,
   the sleeve being formed of resilient but ultimately deformable metal to permit flexing of the ears and the distal ends of the petals to permit selective progressive torsional distortion of the pillars upon continued tightening of the pressure member caused by pressure between the opposite ends of the sleeve, whereby to cause pre-loading of the anchor with the hole.

* * * * *

UNITED STATES PATENT AND TRADEMARK OFFICE
CERTIFICATE OF CORRECTION

PATENT NO. : 4,720,224
DATED : January 19, 1988
INVENTOR(S) : William H. Peterken It is certified that error appears in the above-identified patent and that said Letters Patent is hereby corrected as shown below:

Column 7, line 53, Claim 4    Delete "chamber" add in its place ---member---
Column 8, line 6, Claim 4     "togther" should be ---together---
Column 8, line 36, Claim 5    Delete "shaped" add in its place ---spaced---
Column 8, line 40, Claim 5    "pillrs" should be ---pillars---

Signed and Sealed this

Nineteenth Day of July, 1988

*Attest:*

DONALD J. QUIGG

*Attesting Officer*    *Commissioner of Patents and Trademarks*